(12) United States Patent
Rohs et al.

(10) Patent No.: US 6,435,327 B1
(45) Date of Patent: Aug. 20, 2002

(54) DISENGAGING DEVICE FOR A CLUTCH

(75) Inventors: Ulrich Rohs, Düren; Dietmar Heidingsfeld, Aachen, both of (DE)

(73) Assignee: Rohs-Voigt Patentverwertungsgesellschaft mbH, Dueren (DE)

( * ) Notice: Subject to any disclaimer, the term of this patent is extended or adjusted under 35 U.S.C. 154(b) by 0 days.

(21) Appl. No.: 09/659,751

(22) Filed: Sep. 11, 2000

(30) Foreign Application Priority Data

Sep. 10, 1999 (DE) .......................................... 199 43 339

(51) Int. Cl.⁷ .............................................. F16D 25/06
(52) U.S. Cl. ................................... 192/85 R; 192/91 R
(58) Field of Search ............................ 192/85 C, 91 R, 192/30 W, 101, 111 A, 114 R, 85 R; 91/510; 92/62

(56) References Cited

U.S. PATENT DOCUMENTS

| 4,664,239 A | | 5/1987 | Symes et al. |
| 4,705,151 A | | 11/1987 | Leigh-Monstevens et al. |
| 5,795,263 A | * | 8/1998 | Harries ................ 192/30 W X |
| 5,809,830 A | | 9/1998 | Chazot |
| 6,116,399 A | * | 9/2000 | Drexl et al. ............... 192/91 A |
| 6,213,271 B1 | * | 4/2001 | Rohs et al. ........... 192/91 R X |

FOREIGN PATENT DOCUMENTS

| DE | 38 06 642 | 9/1989 |
| DE | 695 01 874 | 12/1995 |
| DE | 198 28 198 | 9/1999 |
| EP | 0 267 033 | 7/1990 |
| EP | 0 561 506 | 9/1993 |
| EP | 0 942 190 | 9/1999 |

\* cited by examiner

*Primary Examiner*—Rodney H. Bonck
(74) *Attorney, Agent, or Firm*—Collard & Roe, P.C.

(57) ABSTRACT

A disengaging device particularly for a clutch, with an energy storage device supplying energy when the clutch is disengaged, and storing energy in a reversed process, has a device for increasing the energy in the energy storage in dependence upon a force occurring in the disengaging device. The device for increasing energy comprises a hydraulically or pneumatically actuated punch with a variable active surface.

32 Claims, 5 Drawing Sheets

DISENGAGING DEVICE FOR A CLUTCH

BACKGROUND OF THE INVENTION

1. Field of the Invention

The present invention relates to a disengaging device for a clutch. Such disengaging devices are installed in many different ways in the driving trains of different assemblies to accomplish a disengaging movement. Such disengaging devices are especially employed as force converters in order to translate a manually exerted force, or a force exerted in a defined direction, into a force that is mechanically directed in a defined way. Such disengaging devices can release clutches of motor vehicles.

2. The Prior Art

Such a disengaging device is known from DE 38 06 642 A1. This disengaging device has an energy storage means which supplies energy in the disengaging process, and which stores energy in a reversed process. The forces required for such a disengagement process are thus reduced. Such a disengaging device is especially suited for mechanical devices that can be disengaged only against relatively high resetting forces.

Two springs arranged perpendicular to a disengaging piston act as the energy storage means for this known disengaging device. The springs interact with an antifriction bearing serving as the force-coupling element, which is guided on the disengaging piston along a substantially conical, curved track. Depending on the existing wear, an assembly supporting the curved track can be displaced along the disengaging piston. It is possible to take into account wear of the clutch or similar displacement movements that occurred over long periods of time. Such an assembly is displaced in proportion to the traveling distance of the disengaging piston.

SUMMARY OF THE INVENTION

It is therefore an object of the present invention to provide a disengaging device for a clutch, with an energy storage means that supplies energy in the disengagement process, and stores energy in a reversed process. It is possible with this device to adapt the storage of energy to all kinds of different situations in a relatively simple way.

The invention proposes a disengaging device of the type specified above that increases the energy in the energy storage in dependence upon a force occurring in the disengaging device. This is accomplished by a hydraulically or pneumatically actuated punch having a variable active surface.

By varying the active surface in dependence on the distance of disengagement of the punch, the characteristic by which the punch increases the energy in the energy storage means as a result of the force occurring in the disengaging device, can be readily adapted to the given requirements. As compared to the solution as defined by the invention, it was found that attempts to adapt such a characteristic using plate springs, sets of springs, or individual springs, require substantially more difficult coordination, and also lead to relative instability with respect to the structure of the device, or to relatively large volumes of the structure of such a device.

The increase in energy can be made directly dependent upon the force occurring in the disengaging device if the punch is actuated by a disengaging hydraulic or pneumatic system that is prompted into action by the disengaging device. In such an arrangement, a change in pressure in the hydraulic or pneumatic system conditions an effect that is directly acting on the punch. Such an arrangement was found to be particularly advantageous for the area of the clutch where hydraulic or pneumatic systems are regularly employed between the disengaging device and the clutch. In particular, clutch wear leads to an increase in the pressure in the hydraulic or pneumatic system, which causes an effect acting on the punch and consequently a rise of the energy in the energy storage means.

In one embodiment of the invention, the punch can be sealed against a guide surface having a directional component pointing away from or in the direction of the punch. The consequence of such an arrangement is a variable active surface that is conditioned by the seal. The size of the active surface changes depending on the directional component of the guide surface that is pointing away from or in the direction of the punch. Depending on the position of the punch along its path of travel, the guide surface is consequently disposed either closer to or farther from the punch. Conditioned by the seal, the hydraulic or pneumatic pressure is therefore acting on a larger or, respectively, a smaller surface, the result being that the overall force acting on the punch is higher or lower accordingly.

In particular, the punch may be guided in a space which has a cross section that varies along the traveling path of the punch. Preferably, the variation in the cross section takes place symmetrically in relation to an axis of symmetry of the punch, so that the punch will be loaded as uniformly as possible.

The punch can be arranged in an annular gap whose radially inner wall and/or radially outer wall varies along the path of travel of the punch. With such an arrangement, the punch is formed ring-shaped. This offers the advantage of an especially compact design, particularly with substantially linear disengaging devices such as a hydraulic or pneumatic disengaging piston. If the wall varies along the path of travel of the punch, the direct result thereof is a variation in the width of the annular gap along the path of the punch, which results in a corresponding variation of the active surface.

In particular, it is advantageous if both the radially inner wall and the radially outer wall are varied along the path of travel of the punch. Such a variation can be selected so that the active surface of the punch changes symmetrically with respect to the punch, so that the punch is evenly loaded. Canting of the punch can thus be avoided with this design.

Sealing of the punch, so that it can be acted upon hydraulically or pneumatically, can be accomplished with a sealing ring that seals a gap located between the punch and the wall via a sealing lip. The sealing lip is capable of following a change in the width of the gap and in that way permits a variable active surface of the punch.

If a sealing ring with a U-shaped profile is used as the sealing element, the punch can be made inexpensively because it is possible to use a standard-type grooved ring.

The force acting on the punch or on the seal is distributed evenly if the sealing ring with a U-shaped profile abuts a wall with each of its legs. Especially in conjunction with such an application of the seal, it is advantageous if the walls abutted by each of the legs vary evenly, so that the ratios of the force acting on the sealing ring will be uniform as well.

If such a sealing ring is employed, it only needs to rest on a readjusting piston of the punch, so the disengaging device can be built in a relatively simple way.

Furthermore, the disengaging device may comprise means for measuring the distance traveled by the punch. Irrespective of the way in which the punch is actuated, this makes it possible to determine the force occurring in the disengaging device. This force may be the measure for any wear of the clutch, or a measure for similar purposes. It is thus possible to indirectly obtain information about any wear of the clutch at low cost, and to assure replacement of the clutch in due time.

Preferably, the holding means prevents the punch from traveling back into its starting position when the force is reduced. This assures that in spite of any reduction in the force, as it regularly occurs with such disengaging devices, the punch will remain in a position corresponding with the maximal force. To that extent, the punch provides an indication as to what the status of the clutch is at any time with respect to wear or similar conditions. Moreover, the holding means assures that a rise in energy in the energy storage can take place in a continuous way.

In particular, the holding means may comprise a hydraulic or pneumatic check valve. Instead, or in addition, there may also be a locking device. This locking device may comprise spring tongues that engage behind a stop means which is actively connected with the punch, or with a readjusting piston.

The measuring means may comprise a binary sensor such as a piezo element located in an end position of the punch. This end position is selected so that when the punch is located in the end position, wear has progressed to an extent that the condition needs to be indicated. The sensor may transmit a signal for such indication and signals the need for action.

Furthermore, the measuring means may comprise a potentiometer or the like that is actively connected with the punch and shows the instantaneous position of the punch. Wear or the maximal power occurring in the disengaging device can be detected at any time.

For safety reasons and in order to avoid overloading of the energy storage means, there can be a rigid stop on which the punch runs up in the presence of a defined force. Starting from this position, no increase in energy takes place in the energy storage means, so that any further increase in the counteracting force in the disengaging device is passed on directly. Therefore, it is possible starting from this point in time to be alerted to the fact that more energy is required in order to actuate the disengaging device. As described above, the energy storage means otherwise compensates the rising force as accurately as possible.

The energy storage as defined by the invention, or measuring device as defined by the invention, can be in any desired location independent of any of other features, i.e. in a driving train up to the location of the assembly to be disengaged, or even in the assembly itself that has to be disengaged.

If the energy storage comprises a coupling element that actively connects a storage element of the energy storage means with an actuating element of the disengaging device, the actuating element may comprise an angle (or toggle) lever. As compared to a relatively space-saving arrangement with bevels and guide surfaces that are arranged in opposite directions, and which forces rolls against a disengaging piston in a suitable way, this arrangement allows the force to be controlled in a substantially more reliable way with no change in the space requirements. In particular, hysteresis, if any should occur, can be reduced. Furthermore, such an angle lever permits a substantially more accurate adjustment of the overall arrangement.

Such a toggle lever can be employed independently of the means for increasing the energy in the energy storage means depending on the force occurring in the disengaging device.

The toggle lever can also have a roll that is rolling on a contour connected with the actuating element. This arrangement, which omits additional rolls, reduces the overall cost.

Moreover, the toggle lever can be built in a relatively small size, so that the roll can be readily supported on the toggle lever via a ball bearing. The device can be realized in that way with a much smoother performance without the necessity of providing for additional space for its construction.

An advantageous flow of force can be developed in the overall arrangement if the angle lever has a roll arm as well as a holding arm, and if the lever is actively connected with the storage element. The flow of force between the actuating element and the storage element can then be realized via the pivot in a relatively solid way in a small construction space.

The movement of the overall arrangement can be easily controlled if the holding arm is connected with a fixed assembly of the storage element, preferably with a cylinder. This is especially advantageous if the cylinder also absorbs the counteracting forces of the storage element, so that the overall arrangement can be realized free of any force. It is then possible to select a substantially lighter weight for the casing of the disengaging device because the casing no longer needs to absorb any forces.

The holding arm is connected with the fixed assembly via a flexible holding element. Such a holding element facilitates the installation and can be made with a lighter weight and smaller size than the fixed assembly, because substantially lower forces occur. If the holding element is a flexible element, the angle lever is capable of following any displacement conditioned by the storage element and by the actuation of the disengaging device with substantially greater accuracy.

If the pivot is arranged on an additional lever arm of the angle lever, the site in which the interaction between the toggle lever and the storage element takes place can be easily shifted to a desired position. In particular, it is possible to advantageously adapt the force ratios to the concrete embodiment of the device.

Loads acting on the toggle lever can be avoided if there is a bearing on the storage element for the lever arm with the pivot. This bearing exerts a force from the storage element on the angle lever parallel with the lever arm. Bending of the toggle lever can be reduced because the forces raised by the storage element in the disengagement process do not apply any bending moments to the lever arm.

It is especially advantageous if the roll arm and the lever arm with the pivot are arranged in a straight line in relation to each other. Such an arrangement is simple in terms of engineering, and inexpensive. On the other hand, such an arrangement allows the forces raised by the storage element to be applied to the actuating element.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
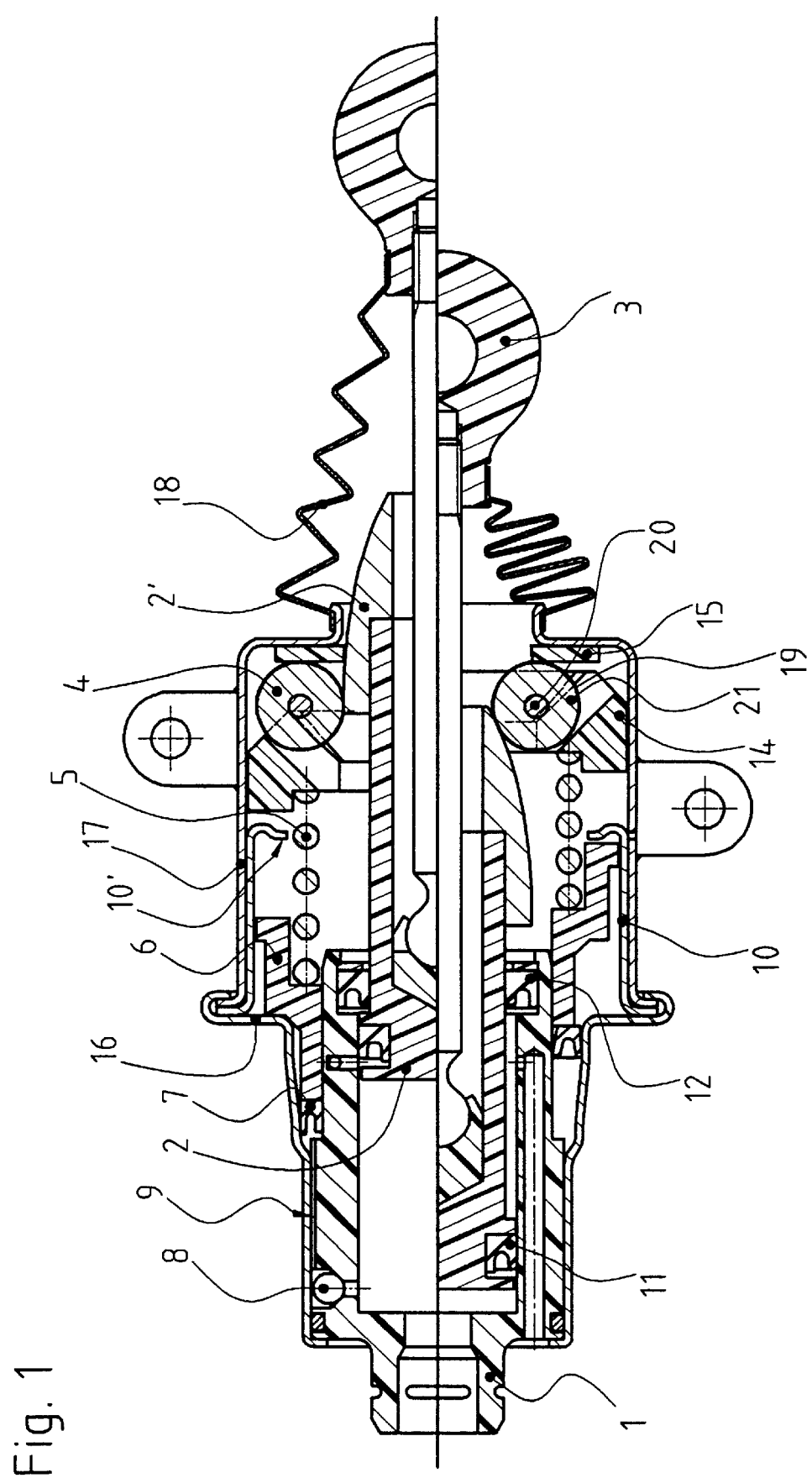
FIG. 1 is a sectional view of a first disengaging device as defined by the invention, whereby the upper half shows the disengaging device in the non-actuated condition and the lower half illustrates the disengaging device in the worn and actuated state.
Figure 2:
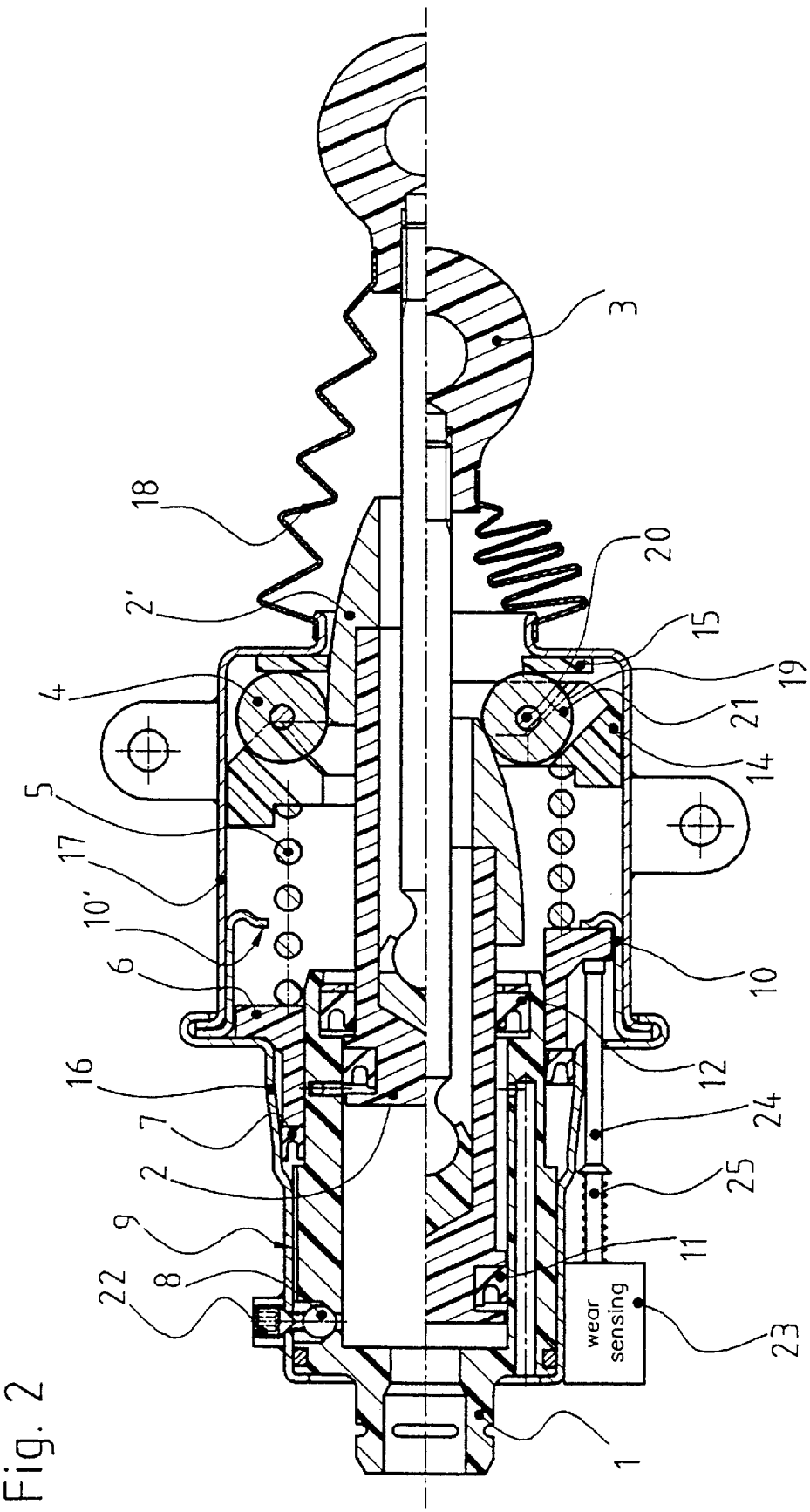
FIG. 2 is a sectional view of a second disengaging device as defined by the invention, by a representation similar to FIG. 1.
Figure 3:
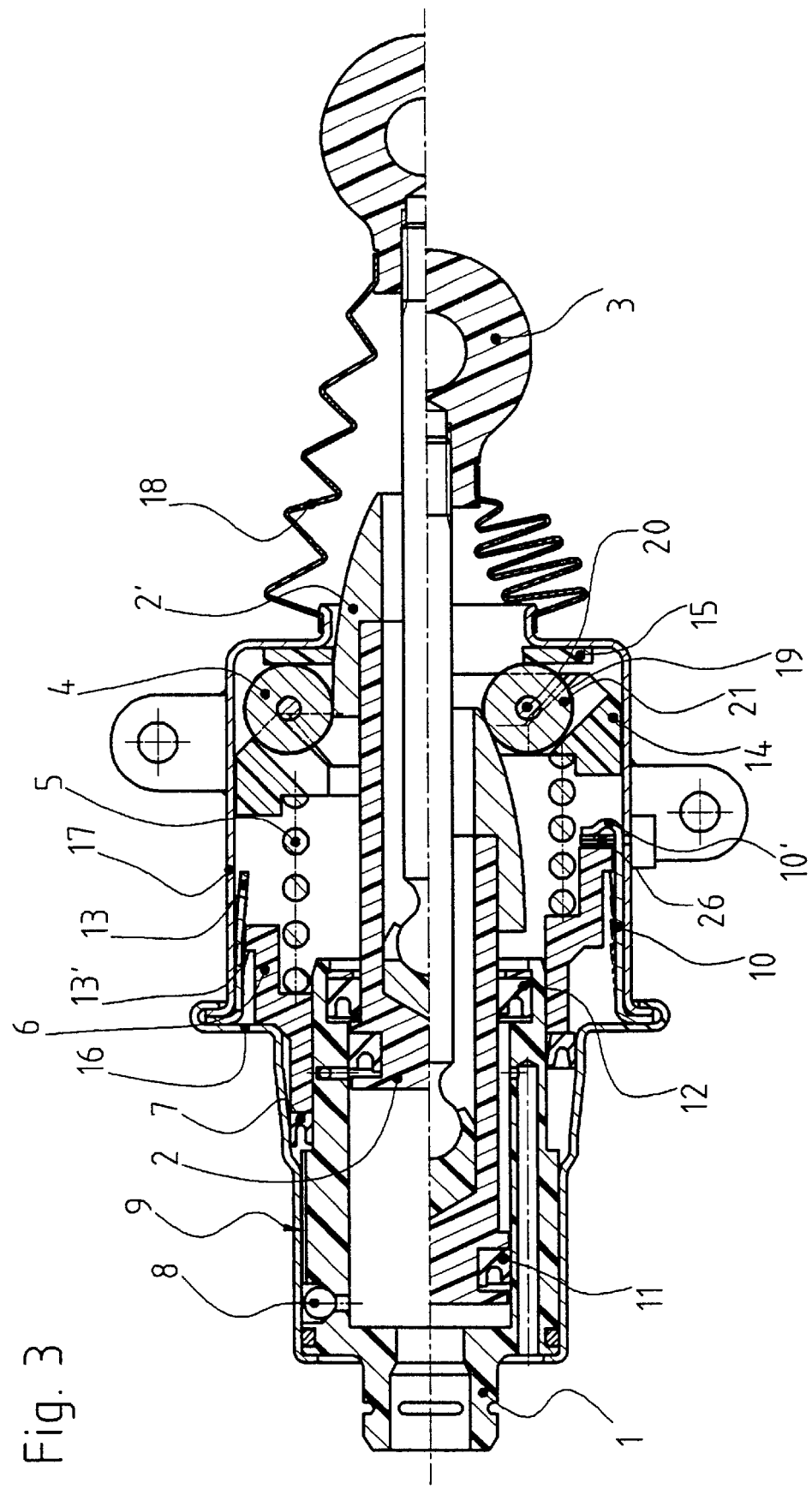
FIG. 3 is a sectional view of a third disengaging device as defined by the invention, by a representation similar to those shown in FIGS. 1 and 2.

The disengaging devices shown in FIGS. 1 to 3 comprise a coupling in the form of a cylinder 1 of a hydraulic system actuating the coupling process. There is a piston 2 capable of building up a disengaging pressure. Piston 2 is actuated by a clutch pedal rod 3, which is actively connected with a corresponding clutch pedal. Cylinder 1 is sealed by seals 11 and 12 and is enclosed by a casing part 16. The disengaging device has another casing part 17, which is joined with casing part 16 by a flange-type connection. Casing 16, 17 is completely sealed as a whole unit by a bellows 18, which is arranged between the casing part and the clutch pedal rod 3.

At its end on the side of the pedal, piston 2 has a contour 2'. Rolls 4, which are initially tensioned by springs 5, run on contour 2'. There is a means for reversing the force arranged between springs 5 and the rolls 4. Rolls 4 act as the force-coupling elements. The reversing means comprise a force-reversing ring 14 with a bevel as well as a disk 15 with a guiding surface. Via springs 5, the bevel and the guiding surface, rolls 4 are initially tensioned so that they exert a force directed radially inwards, which acts on the contour 2'. When the clutch pedal is depressed, rolls 4 are capable of shifting their positions in the direction of the clutch pedal rod 3. This causes force-reversing ring 14 to move against the direction of actuation of clutch pedal rod 3. In this process, the springs are relieved and transmit a corresponding force to piston 2. When the clutch is engaged again, a plate spring of the clutch or a similar element pushes piston 2 back into its starting position, and spring 5 is tensioned again.

The desired amplification can be selected in any desired way via the pedal by designing the piston contour 2' or the other assemblies accordingly.

The bevel and contour 2' are substantially guided in opposite senses in relation to each other.

Rolls 4 comprise rollers 21, which are guided on an axle 20. Rollers 21 are in contact with contour 2, and axles 20 are in contact with the bevel of the force-reversing ring 14. The radii of rollers 21 and axles 20 are selected so that they have a ratio of 1:√2 conforming to an angle of inclination of 45° of the bevel. Thus, an approximately slip-free movement of rolls 4 can be assured even if axles 20 and rollers 21 are permanently connected with each other in a fixed way. Slip cannot be completely avoided because of the nonlinear expanse of the contour 2'. To reduce losses due to friction, axles 20 and rollers 21 are not in one single piece, and are capable of rotating relative to one another. If the friction is sufficiently low, a one-piece embodiment is conceivable as well.

In order to reduce friction loss even further, it is possible to support two plastic disks 19 on the axle 20, the disks being arranged on both sides of each roller 21. The diameter of plastic disks 19 is selected slightly larger than the diameter of the rollers 21. In this way, the plastic disks 19 are supported on the guide surface of disk 15, so that rollers 21 are not obstructed by disk 15. The diameter of plastic disk 19 is selected sufficiently small to assure that the rotation of the rollers is not hindered by the contour 2'. Such a design is made possible due to the circular cross section of contour 2'.

So that the disengaging device can be adapted to differences existing between a new and a worn clutch, spring 5 supports itself on a substantially ring-shaped re-adjusting piston 6, which in combination with a sealing ring 7 forms a punch. Re-adjusting piston 6 is acted upon by a system pressure of the hydraulic clutch actuation coming from the cylinder 1. The pressure is tapped in cylinder 1 and is supplied to the readjusting piston 6 via a check valve 8 and a calibrated throttle 9.

As the wear of the clutch progresses, the forces required for its disengagement increase as well, which leads to a proportionate rise in the operating pressure. Since the pressure is applied to the readjusting piston 6, the tensioning of spring 5 rises in proportion to the system pressure and therefore in proportion to the disengaging force. This means that the relief of force of the clutch pedal takes place with a constant factor over the useful life of the clutch. Since only low forces are acting in the system, the factor may be high. What needs to be assured is only that the pedal force will never become negative, taking into account hysteresis, and that the desired clutch characteristic is kept preserved.

The function of check valve 8 is to maintain the pressure acting on readjusting piston 6 and therefore the initial tension of spring 5 at its maximal value. The throttle permits disengagement of the clutch even if the pressure has been lost via the re-adjusting piston 6 after a longer time of inactivity. The required pressure is built up again after the clutch has been operated a few times.

Readjusting piston 6 is displaceably supported in a ring gap between casing part 16 and cylinder 1. Gaps remaining between re-adjusting piston 6 and casing part 16, or cylinder 1 are sealed by sealing ring 7 with a U-shaped profile. The sealing ring is arranged on the system pressure side downstream of re-adjusting piston 6. Other shapes of the profile are conceivable as well, such as an L-shaped or square profile. In this connection, sealing ring 7 of the punch rests with each of its legs against a wall of the annular gap between casing part 16 and cylinder 1.

Sealing is consequently effected via sealing lips that are capable of adapting to a varying contour. The figures show that in the present invention, the radially outer wall of the annular gap is provided with a contour. When readjusting piston 6 is moved into the annular gap, the cross section of the gap changes and the sealing lips of sealing ring 7 follow the cross section accordingly. A punch with a variable active surface is thus made available via sealing ring 7 and readjusting piston 6.

Furthermore, within the interface zone between casing parts 16 and 17, a holding ring 10 is included in the flanged joint, and has a stop 10' that limits the maximum stroke of the readjusting piston 6.

The embodiment shown in FIG. 2 comprises a venting means 22 that is arranged directly at the level of the check valve 8. This arrangement makes it possible to replace the ball of the check valve 8 at a later time, or to access it for maintenance purposes. Also, it is possible to have a spring that influences the sealing properties of the check valve 8, disposed between the venting screw 22 and the ball 8. Arranging venting 22 in this location offers the advantage that venting takes place significantly more rapidly than it would if the venting means were provided downstream of throttle 9.

In order to prevent re-adjusting piston 6 from vacating a predetermined position after a longer period of time, and to be returned to its starting position by the spring 5, the ring 10 shown in FIG. 3 has spring tongues 13 which lock in preselected positions behind the stops 13' on readjusting piston 6.

Furthermore, the embodiments shown in FIGS. 2 and 3 are provided with means for measuring the distance traveled by the punch or sealing ring 7 and readjusting piston 6. In the embodiment shown in FIG. 2, this means is a potentiometer that is pressed by a spring 25 against readjusting piston 6 via a push rod 24, the spring interacting with the punch. It is therefore possible to measure the position of the punch at any time and to thus obtain information about the wear. In the embodiment shown in FIG. 3, there is a piezo element 26 on the stop 10' that indicates that the readjusting piston 6 has reached the stop 10'. It is therefore possible to indicate when a maximal wear of the clutch that can still be compensated by the disengaging device has occurred.

Figure 4:
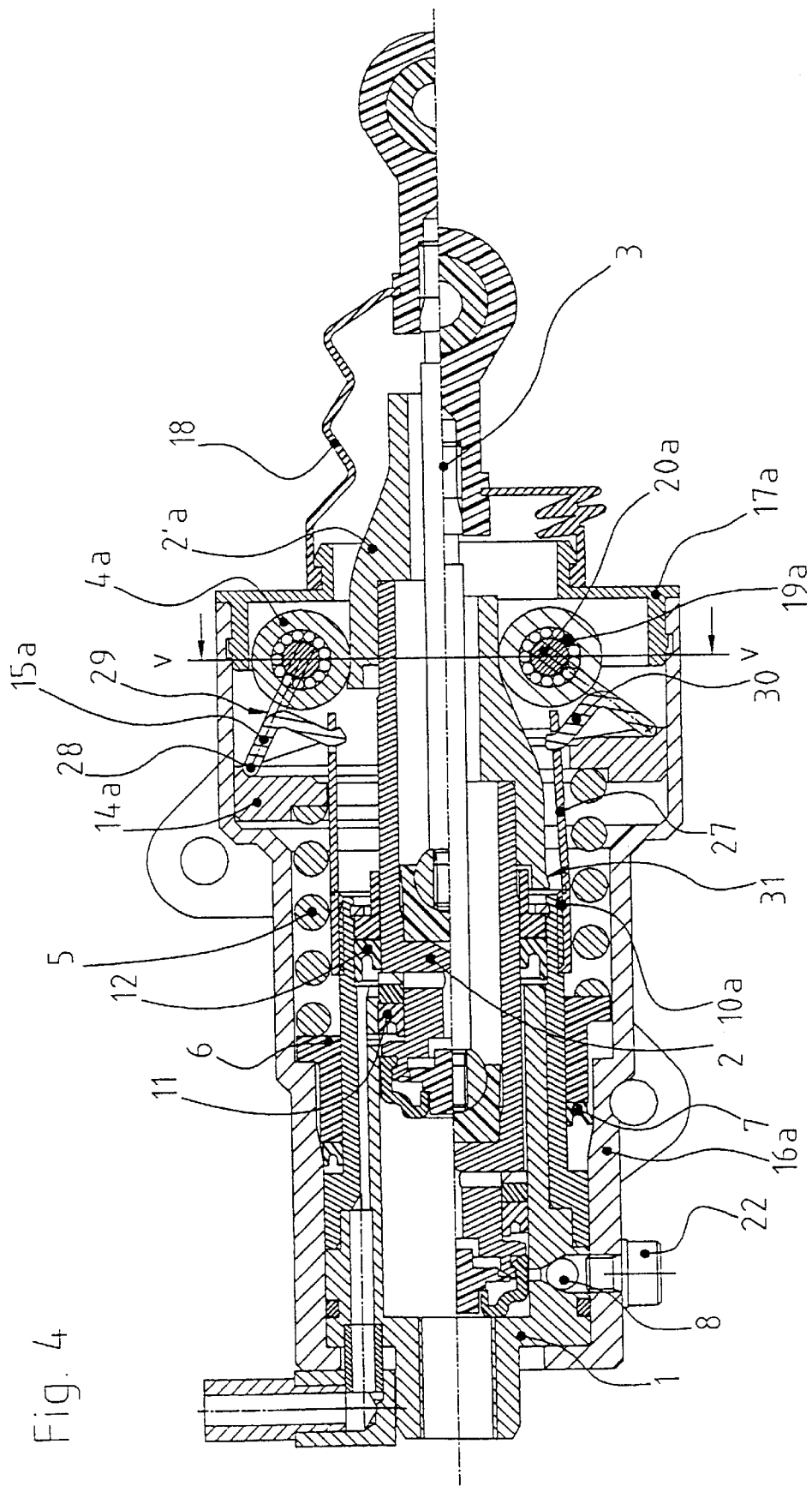
FIG. 4 is a sectional view of a fourth disengaging device as defined by the invention, by a presentation similar to those in FIGS. 1 to 3.
Figure 5:
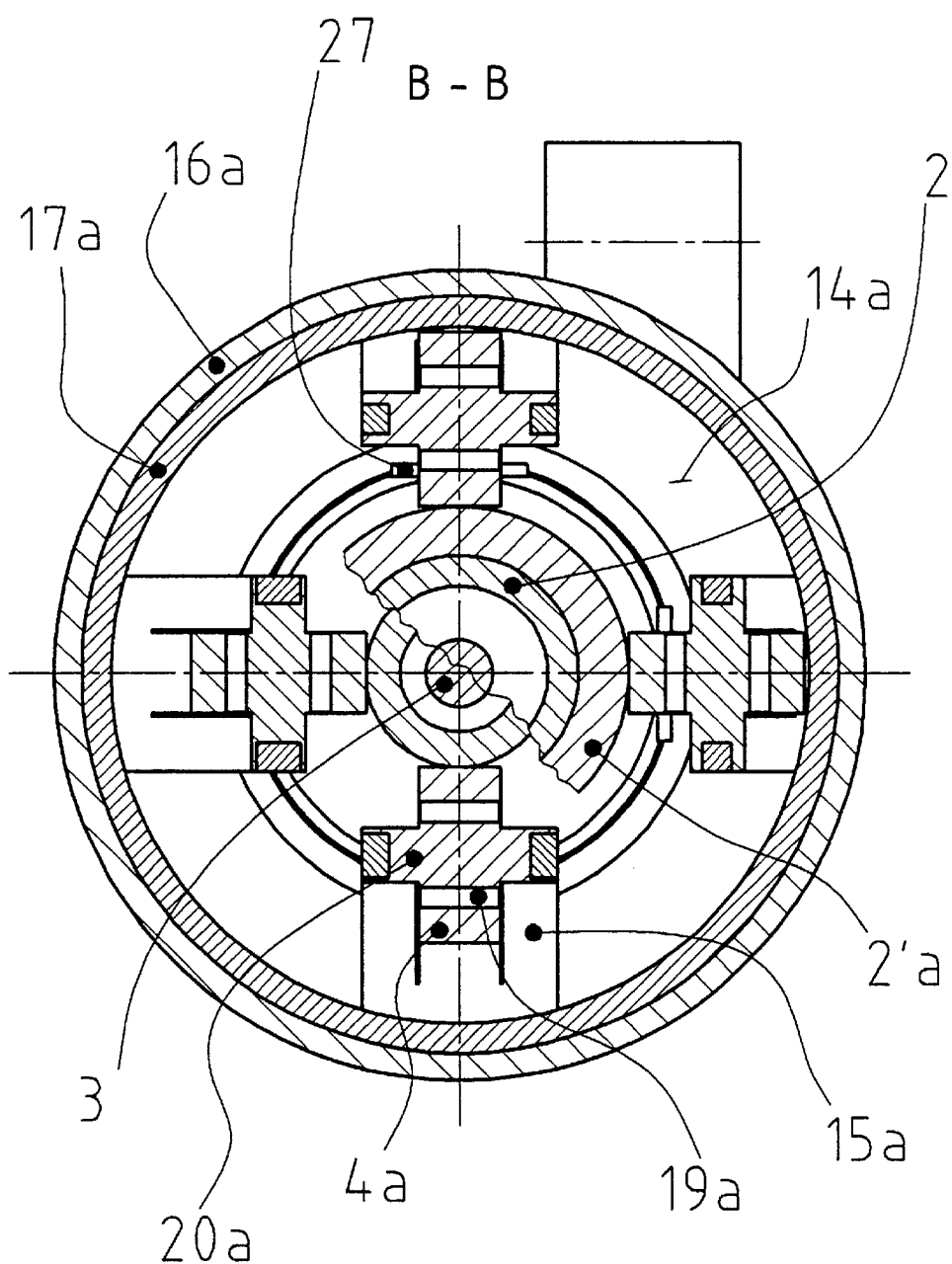
FIG. 5 is a sectional view of the disengaging device according to FIG. 4, with a section along line V—V in FIG. 4.

The embodiment shown in FIGS. 4 and 5 substantially corresponds with the embodiment shown in FIGS. 1 to 3, and identically acting assemblies are denoted to that extent by the same reference numerals. Substantially deviating assemblies are denoted by the letter "a".

In the embodiment shown in FIGS. 4 and 5, coupling takes place between the storage element comprising the spring 5, and the disengaging piston 2 via an actuating element that comprises an angle lever 15*a*. There is a roll 4*a* on angle lever 15*a* that rolls on the contour 2'*a*. This roll is supported via a ball bearing 19*a* mounted on an axle 20*a* which is connected with angle lever 15*a*.

In this embodiment, axle 20*a* is supported on a roll arm 29 of angle lever 15*a*. Furthermore, angle lever 15*a* has a holding arm 30 that engages a pull rod 27 serving as the holding element. Pull rod 27 is fixed via a holding ring 10*a* that engages a cylinder for punch 6, 7. As shown in FIGS. 4 and 5, pull rod 27 is capable of following movements of the angle lever 15*a* by inclining.

Furthermore, angle lever 15*a* comprises another lever arm on which there is a pivot 28. This further lever arm engages a corresponding bearing on a disengaging piston 14*a*, to which force is admitted by spring 5. In the present embodiment, the bearing is adapted to the surface of the lever arm on pivot 28 so that an almost vertical force is exerted on the angle lever 15*a* along the lever arm.

Roll arm 29 and the lever arm with pivot 28 are arranged linear in relation to each other, so that the forces are directly transmitted up to roll 4*a*. The angle lever 15*a* can be manufactured in the form of a molded sheet metal component.

FIG. 4 shows that the arrangement comprising spring 5, punch 6 as well as the associated inside cylinder with the pull rod 27, and the angle lever 15*a* and the punch 14*a* is nearly free of outward force. Therefore, such an arrangement makes it possible to design casing 16*a* with a relatively lightweight construction. In particular, cover 17*a* of the casing is not assuming any force-transmitting function, so that it can be produced with an extremely low weight and at favorable cost as compared to the embodiments shown in FIGS. 1 to 3.

FIG. 4 shows that contour 2'*a* has a run-up bevel 31 on its side facing piston 2, which acts as an assembly aid.

Accordingly, while only a few embodiments of the present invention have been shown and described, it is obvious that many changes and modifications may be made thereunto without departing from the spirit and scope of the invention.

What is claimed is:

1. A disengaging device for a clutch, comprising
an energy storage device that supplies energy when the clutch is disengaged and stores energy in a reverse process; and
means for increasing the energy in the energy storage device in dependence of a force occurring in the disengaging device, said means comprising a hydraulically or pneumatically actuated punch with a variable acting surface.

2. The disengaging device according to claim 1, wherein the punch is actuated by a disengaging hydraulic or pneumatic system prompted by the disengaging device.

3. The disengaging device according to claim 1, wherein the punch is sealed against a guide surface having a directional component facing away from or pointing at the punch.

4. The disengaging device according to claim 1, wherein the punch is guided in a space whose cross section varies along a path of travel of the punch.

5. The disengaging device according to claim 1, wherein the punch is arranged in an annular gap whose radially inner wall and radially outer wall varies along the punch.

6. The disengaging device according to claim 5, further comprising a sealing ring sealing a gap between the punch and a wall via a sealing lip.

7. The disengaging device according to claim 6, wherein the sealing ring has a U-shaped profile having two legs.

8. The disengaging device according to claim 7, wherein the legs of the sealing ring rests against a wall.

9. The disengaging device according to claim 6, wherein the sealing ring rests on a pressure side of a readjusting piston.

10. The disengaging device according to claim 1, further comprising a device for measuring distance traveled by the punch.

11. The disengaging device according to claim 10, wherein the measuring device comprises a potentiometer actively connected with the punch.

12. A disengaging device for a clutch, comprising
an energy storage device that supplies energy when the clutch is disengaged and stores energy in a reverse process;
means for increasing the energy in the energy storage device in dependence of a force occurring in the disengaging device, said means comprising a hydraulically or pneumatically actuated punch with a variable acting surface; and
a binary sensor provided in an end position of the punch for measuring distance traveled by the punch.

13. The disengaging device according to claim 12, wherein the binary sensor comprises a piezo element.

14. A disengaging device for a clutch, comprising
an energy storage device that supplies energy when the clutch is disengaged and stores energy in a reverse process;
means for increasing the energy in the energy storage device in dependence of a force occurring in the disengaging device, said means comprising a hydraulically or pneumatically actuated punch with a variable acting surface; and a holding device preventing the punch from returning to its starting position when force is reduced.

15. The disengaging device according to claim 14, wherein the holding device comprises a hydraulic or pneumatic check valve.

16. The disengaging device according to claim 14, wherein the holding device comprises a locking device.

17. The disengaging device according to claim 16, wherein the holding device comprises at least one spring tongue adapted to be engaged behind a stop.

18. A disengaging device for a clutch, comprising an energy storage device that supplies energy when the clutch is disengaged and stores energy in a reverse process;

means for increasing the energy in the energy storage device in dependence of a force occurring in the disengaging device, said means comprising a hydraulically or pneumatically actuated punch with a variable acting surface; and a rigid stop against which the punch runs up in the presence of a defined force.

19. A disengaging device for a clutch, comprising an energy storage device that supplies energy when the clutch is disengaged and stores energy in a reverse process; and means for increasing the energy in the energy storage device in dependence of a force occurring in the disengaging device, said means comprising a hydraulically or pneumatically actuated punch with a variable acting surface, wherein the energy storage device has a coupling element actively connecting a storage element of the energy storage device with an actuating element of the disengaging device, said actuating element comprising an angle lever.

20. The disengaging device according to claim 19, wherein the angle lever has a roll arm and a holding arm and wherein said lever is actively connected with the storage element via a pivot.

21. The disengaging device according to claim 20, wherein the holding arm is connected with a cylinder of the storage element.

22. The disengaging device according to claim 21, wherein the holding arm is actively connected with the cylinder via a flexible holding element.

23. The disengaging device according to claim 20, wherein the pivot is arranged on an additional lever arm of the angle lever.

24. The disengaging device according to claim 23, further comprising a bearing for the lever arm with the pivot, said bearing being disposed on the storage element, said bearing exerting a force directed substantially parallel with the lever arm from the storage element onto the angle lever.

25. The disengaging device according to claim 20, wherein the roll arm and the lever arm with the pivot are arranged in a straight line in relation to each other.

26. The disengaging device according to claim 19, further comprising a roll on the angle lever, said roll rolling on a contour connected with the actuating element.

27. The disengaging device according to claim 26, wherein the roll is supported on the angle lever by a ball bearing.

28. A disengaging device for a clutch, comprising an energy storage device that supplies energy when the clutch is disengaged and stores energy in a reverse process;

means for increasing the energy in the energy storage device in dependence of a force occurring in the disengaging device, said means comprising a hydraulically or pneumatically actuated punch; and a binary sensor provided in an end position of the punch for measuring distance traveled by the punch.

29. A disengaging device for a clutch, comprising an energy storage device that supplies energy when the clutch is disengaged and stores energy in a reverse process;

means for increasing the energy in the energy storage device in dependence of a force occurring in the disengaging device, said means comprising a hydraulically or pneumatically actuates punch; and a holding device preventing the punch from returning to its starting position when force is reduced.

30. The disengaging device according to claim 29, wherein the holding device comprises at least one spring tongue adapted to be engaged behind a stop.

31. A disengaging device for a clutch, comprising an energy storage device that supplies energy when the clutch is disengaged and stores energy in a reverse process;

means for increasing the energy in the energy storage device in dependence of a force occurring in the disengaging device, said means comprising a hydraulically or pneumatically actuated punch; and a rigid stop against which the punch runs up in the presence of a defined force.

32. A disengaging device for a clutch, comprising an energy storage device that supplies energy when the clutch is disengaged and stores energy in a reverse process; and means for increasing the energy in the energy storage device in dependence of a force occurring in the disengaging device, said means comprising a hydraulically or pneumatically actuated punch;

wherein the energy storage device has a coupling element actively connecting a storage element of the energy storage device with an actuating element of the disengaging device, said actuating element comprising an angle lever.

* * * * *